United States Patent [19]

Zweig

[11] Patent Number: 4,914,171

[45] Date of Patent: Apr. 3, 1990

[54] FLUORINATED DIACRYLATES

[75] Inventor: Andrew M. Zweig, Schaumburg, Ill.

[73] Assignee: Allied-Signal Inc., Morris Township, Morris County, N.J.

[21] Appl. No.: 263,152

[22] Filed: Oct. 26, 1988

[51] Int. Cl.[4] ............................................. C08F 18/20
[52] U.S. Cl. .................................................... 526/246
[58] Field of Search ....................................... 526/246

[56] References Cited

U.S. PATENT DOCUMENTS

| 3,879,430 | 4/1975 | O'Rear et al. | 260/348 R |
|---|---|---|---|
| 4,356,296 | 10/1982 | Griffith et al. | 526/242 |
| 4,452,998 | 6/1984 | Griffith et al. | 560/221 |
| 4,511,209 | 4/1985 | Skutnik | 350/96.34 |

OTHER PUBLICATIONS

Photo-Curable Fluorinated Epoxy Resin, S. Ishibashi et al., Proceedings of Conference on Radiation Curing Asia, Tokyo, Japan, Oct. 20–22, 1986.
Chemtech, 1982 (May), pp. 290–293, James R. Griffith.

*Primary Examiner*—Joseph L. Schofer
*Assistant Examiner*—N. Sarofim
*Attorney, Agent, or Firm*—Harold N. Wells; Roger H. Criss; Gerard P. Rooney

[57] ABSTRACT

A difunctional epoxy acrylate monomer is prepared by reacting a highly fluorinated diglycidyl ether with an excess of acrylic acid in the presence of a suitable catalyst. The acrylate has the following structure;

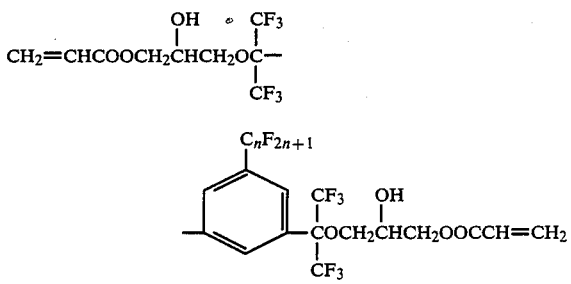

where N is an integer from 1 to 30.

This monomer is totally miscible with nonfluorinated polyacrylates. Clear, colorless, low refractive index polymers can be prepared by polymerization of this monomer or blends with other acrylates to give products useful as low surface energy coatings, and low refractive index coatings, on a wide range of substrates.

7 Claims, No Drawings

FLUORINATED DIACRYLATES

PRIOR ART

The invention pertains generally to fluorine-containing polyacrylate resins, and specifically to fluorine-containing diacrylates prepared from the corresponding fluorinated diglycidyl ethers, or fluoroepoxies.

Fluorinated diacrylates have been the subject of a number of U.S. patents. One such is U.S. Pat. No. 4,452,998 which discloses a diacrylate monomer having the formula:

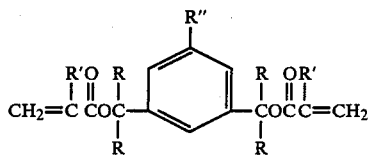
(A)

where R is —$CF_3$ or $C_2F_5$, R' is —H or —$CH_3$, and R" is —H or —$(CF_2)_nF$ where n is an integer from 1 to 10. The monomers are prepared by reacting the aromatic fluorinated diol with acryloyl chloride.

The same inventors disclosed in U.S. Pat. No. 3,879,430 a fluorinated diglycidyl ether having the formula:

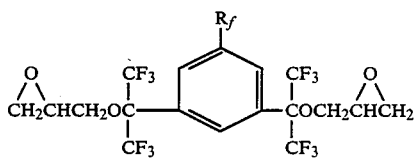
(B)

where $R_F$ is $CF_3(CF_2)_x$ and x is 2 to 10. The group $R_F$ is added as $R_FI$ to a fluoroaromatic precursor having I at the carbon atom where the $R_F$ group is to be attached. The diglycidyl ether is formed by the reaction of the aromatic fluorinated diol precursor with epichlorohydrin.

Such diglycidyl compounds could be reacted with acrylic acid as shown by S. Ishibashi et al in Photo-Curable Fluorinated Epoxy Resin published in Proceedings of Conference on Radiation Curing Asia, Tokyo, Japan, Oct. 20–22, 1986. A fluorinated epoxy acrylate resin is disclosed having the formula:

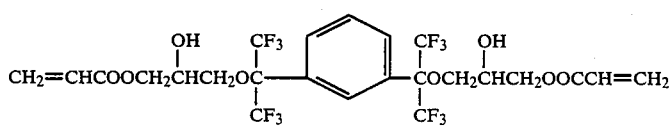
(C)

This compound does not contain the group $R_F$ shown in the '430 patent above. The authors state that introduction of fluorine atoms into epoxy resins improves their optical properties and provide refractive index matching with quartz and optical glass. Specifically, the resin derived from the above monomer was reported to provide a refractive index of 1.458 and thus matched quartz glass or optical fiber reported as 1.46.

The polymers produced from monomer (A) above are suggested in the '998 patent to be useful for many purposes, but the refractive index is not reported nor is there any discussion of applying the polymers as a coating for glass. The same comment applies to monomer (B) disclosed in the '430 patent. Neither patent suggests that the monomer is to be used in combination with other acrylates or that blends with other compounds could be made and successfully used to produce coatings on glass in which the refractive index of the polymer is at or below that of the glass to which it is applied.

Compositions useful for coating glass fibers with a low refractive index fluoroacrylate polymer are discussed in U.S. Pat. No. 4,511,209. The principal objective was to include 50% or more of a highly fluorinated mono-functional acrylate which generally have a low refractive index.

The present inventor has discovered that a particular class of highly fluorinated diacrylates can be blended with other acrylates and when applied to glass provides a refractive index at or below that of the glass.

SUMMARY OF THE INVENTION

A fluorinated diacrylate monomer which is especially useful for preparing clear polymer coatings which have low refractive index, low surface energy, and good thermal stability, mechanical properties and adhesion is defined by the formula:

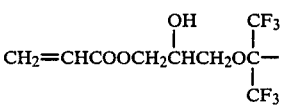

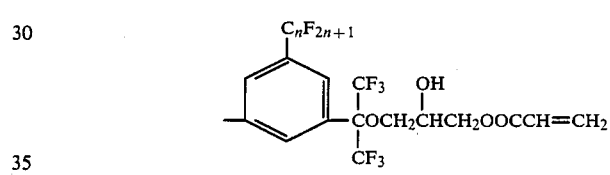

where n is an integer from 1 to 30, preferably 6, 8, or 10. This monomer may be referred to hereinafter as C8DGE-diacrylate.

The fluorinated diacrylate monomer may be used alone or in combination with conventional non-fluorinated polyacrylates and fluorinated mono-acrylates and tri-acrylates to provide coatings. In particular, coatings can be produced which match or have a lower refractive index than glass.

DESCRIPTION OF THE PREFERRED EMBODIMENTS

PREPARATION OF THE MONOMER

The difunctional fluorinated glycidal ether from which the diacrylate may be prepared can be obtained from a multi-step process similar to that described in Griffith, James R., Chemtech. 1982 (May), p290–293. This method begins with the reaction of hexafluoroacetone and benzene to produce a mixture of 1,3- and 1,4-bis (2-(2-hydroxy-1,1,1,3,3,3-hexafluoropropyl)) benzene. The 1,4 isomer can be removed by recrystallization, and the remaining 1,3-isomer can be iodinated in the 5-position using oleum and $I_2$. This 5-iodo compound can be alkylated via an Ullmann condensation reaction using a perfluoroalkyl iodide to yield a 1,3-bis(2-(2-hydroxy-1,1,1,3,3,3-hexafluoropropyl))-5-perfluoroalkylbenzene. The length of the perfluoroalkyl group can be varied, as required for the desired application. The fluorine content and other concomitant properties can thus be modified by selectively varying the length of this perfluoroalkyl group. These 5-substituted diols can be reacted with excess epichlorohydrin in the presence of a catalyst to provide a diglycidyl ether. The difunctional glycidyl ether obtained by this route has the following structure:

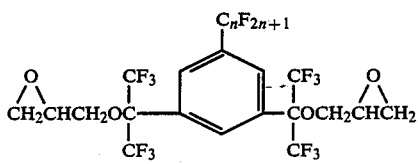

where n is an integer from 1 to 30. Preferably, n is an even integer, particularly 6, 8, or 10.

The fluorinated diacrylate of this invention is obtained from the difunctional fluorinated glycidyl ether by its reaction with acrylic acid. This reaction could be referred to as either an esterification since the final product is an acrylate ester or as a ring-opening reaction in which the epoxide is opened by acid catalysis. This reaction can be performed in an inert solvent, but it is preferred to use a small excess of acrylic acid as the solvent. This reaction possesses both a polar and a charged transition state. Since the ring-opening of an epoxide is a rather exothermic process in the presence of acid or base, many side reactions and undesired by-products might be possible if various polar solvents were utilized. For example, epoxides react with ketones to form ketals (1,3-dioxacyclopentanes). Epoxides react with DMSO to give products containing a $S(O)CH_3$ end-group. The desired product could undergo a transesterification reaction with an ester type solvent such as ethyl acetate or γ-butyrolactone. Protic solvents such as alcohols or amines would also participate in ring-opening. All of types of solvents listed above are unsuitable for this reaction due to formation or potential formation of undesired products. Other polar aprotic solvents such as dimethylformamide, di-methylacetamide, and N-methyl pyrrolidone are often difficult to remove due to low volatility, and their high polarity often makes removal extra difficult even under vacuum at high temperatures. Use of a nonpolar solvent such as toluene, benzene, or ethers such as ethyl ether or tetrahydrofuran would slow the reaction. Thus, the best choice of solvent for this reaction is an excess of acrylic acid.

A variety of catalysts can be used for this reaction, with the most common choices being trialkylamines or hydrochlorides. Under the reaction conditions, the trialkylamines are almost completely protonated, and thus a trialkylammonium acrylate salt is formed. Ammonium salts, whether tertiary or quaternary, will promote ring-opening reactions in the presence of a nucleophile, i.e. esterification of the acrylic acid by the epoxide rather than polymerization (i.e. ring-opening in which the reaction is an etherification).

The progress of this reaction can be readily monitored by observing the disappearance of the infrared absorption band of 930 cm$^{-1}$ due to a ring-stretching vibration of the epoxide group. The reaction may be carried out at a temperature up to about 120° C., but preferably at 100°–110° C. for a time dependent upon the temperature selected. Premature polymerization of the acrylate ester and/or acrylic acid can be prevented even at these high temperatures by addition of 0.10 wt % of a phenolic antioxidant such as BHT and running the reaction under an atmosphere of dry air. Use of an inert atmosphere such as (dry) nitrogen will lead to premature polymerization in the reactor vessel to give a cross-linked rubbery gel containing a large amount of offensive smelling acrylic acid, and oligomers of acrylic acid.

Purification of the desired product may be performed by dilution of the reaction product mixture with a nonpolar, halogenated solvent such as dichloromethane, or preferably, 1,1,2-trichlorotrifluoroethane. This solution is washed with water, and then with a saturated aqueous solution of sodium bicarbonate to remove excess acrylic acid, amines, and ammonium salts. The organic solution in the solvent is then dried over an anhydrous inorganic salt such as sodium sulfate or magnesium sulfate. Once dried, this organic solution of the product is yellow, and possesses a strong odor of residual acrylic acid and its oligomers. Removal of these colored by-products and odoriferous impurities is accomplished by treating the dried solution with activated carbon, then percolating the solution through a column of activated alumina (neutral, Brockmann grade 1). The eluant is colorless to pale straw in color, and usually odor-free. If excess color or odor remains, percolation through a fresh second column may be required but losses of 5–15% are often associated with each column. Removal of solvent under reduced pressure at moderate temperatures (30°–45° C., 1–15 mmHg pressure) yields a viscous, colorless, odorless liquid. Analysis of the product by $^1H$ NMR spectroscopy clearly confirms the identify of this product.

This highly fluorinated difunctional material is referred to as a monomer since no polymerization has occurred. The presence of acrylate polymer is detectable by $^1H$ NMR by measurement of the area of the signals due to the methine and methylene groups comprising the backbone of an acrylate polymer. These resonances are completely resolved from all other resonances in the $^1H$ NMR spectrum. The presence of epoxy polymer can be detected by measuring the ratio of the areas of the vinyl protons to the area of the aliphatic protons which originated from the gylcidyl group. For pure monomer, the ratio should be 0.5. If some epoxy polymerization has occurred, then the ratio will be less than 0.5 since some glycidyl groups would have reacted to form a polyether rather than an acrylate ester.

PREPARATION OF COATINGS

Once the monomer has been prepared it may be used alone to form a coating. However, it is a particular feature of the invention that the monomer is compatible with many mono or trifunctional fluorinated acrylates, such as perfluoroalkyl methyl acrylates, perfluoro alkyl ethyl acrylates, or the corresponding methacrylates, which makes it possible to blend coatings to meet particular performance criteria. Typical examples will be given below, but more generally blends useful in coatings will contain 50 to 90 volume percent of a fluorinated monoacrylate, 1 to 30 volume percent of a fluorinated triacrylate, and 1–30 volume percent of the fluorinated diacrylate according to the invention.

Contributions of such acrylates to the refractive index of the finished coating are: for a monoacrylate $N_D^{20}=1.32-1.35$; for a triacrylate $N_D^{20}=1.47$; for the diacrylate of the invention $N_D^{20}=1.40$.

Polymerization of the monomer by ultraviolet (UV) light or electron beam (EB) techniques is accomplished by usually drawing out a thin film of the liquid monomer or a blend of the monomer with other acrylates (fluorinated and nonfluorinated), adding in a photoinitiator in the case of the UV curing, and exposing the thin film to the radiation source in an oxygen-free environment. A typical photoinitiator for UV curing would be products such as Irgacure TM 184 or 2,2-diethoxyacetophenone present in levels from 0.1 to 3% by weight with 1–2% by weight being preferred.

While a cured fluorinated monoacrylate film is quite fragile, the fluorinated diacrylate of the invention produces a film with more strength as shown by the following typical measurements:

Mean alternate Stress 1110±57 psi
Nominal Elongation 3–5%
Young's Modules $1.25 \times 10^5$ psi

EXAMPLE I

PREPARATION OF FLUORINATED DIACRYLATE

To a 500 mL round-bottom flask charged with 99.02 gm (0.106 mole) of compound (B) on Page 1 ($C_8DGE$) (C.A.S. No. 85800-11-9) were added 73.0 mL (1.06 moles) of acrylic acid, 1.0 mL (0.0077 mole) of triethylamine, 0.10 gm (0.00045 mole) of BHT, and a Teflon TM stirring bar. A water-cooled reflux condenser was affixed to the flask, and a heating mantle was placed under the flask. A $CaCl_2$ drying tube was attached to the top of the reflux condenser. The pot temperature was raised to 100°–110° C. for three hours, with stirring then allowed to cool and stir at ambient temperature for 16 hours. The solution was diluted with 200 ml of $CH_2Cl_2$, and then washed with 6 100 mL portions of saturated aqueous $NaHCO_3$ solution. The $CH_2Cl_2$ solution was dried over anhydrous $Na_2SO_4$, then filtered. Removal of $CH_2Cl_2$ under vacuum gave 102.62 gm (89.8% of theoretical yield) of a clear, viscous, yellow oil. Further purification was achieved by dissolving about half of the product in 1,1,2-trichlorotrifluoroethane, and passing it through a chromatography column (1 in I.D. × 10 in length) packed with activated, neutral $Al_2O_3$. Elution with 1,1,2-trichlorotrifluoroethane gave a clean, colorless, odorless oil in about 70% recovery. Analysis of this product by several techniques confirmed its identify as the diacrylate derivative of $C_8DGE$. IR analysis (thin film, NaCl plates) revealed the oxirane ring stretching vibration (930 $cm^{-1}$) from the starting material, $C_8DGE$, is totally absent in the product, indicating complete reaction. The presence of the large O—H stretch at 3490 $cm^{-1}$ and the C=C stretches at 1620 and 1640 $cm^{-1}$ support that proposed structure. The $^1H$ NMR spectrum ($CDCl_3$ solution) of the product indicated that ratio of the area of the vinyl protons to the area of the aromatic protons was 5.9:3.0, in good agreement with calculated ratio of 6.0:3.0. Additionally, $^1H$ NMR spectroscopy easily allows determination of the amount of acrylic polymeric impurities. The —$CH_2$— and —CH groups in polyacrylate backbone ($\flat 1.3$ and $\delta 2.5$, respectively) are completely resolved from all other proton groups. Repeat of the chromatographic purification step can reduce this level to <5% (by $^1H$ NMR integration). The refractive index of the product was 1.402 ($n_D20$).

EXAMPLE II

UV AND EB CURING OF $C_8DGE$-DIACRYLATE

The product described in Example I was totally miscible with conventional, nonfluorinated polyacrylates such as TMPTA (trimethylolpropane tri-acrylate) or 2-ethyl-2-(hydroxymethyl)-1,3-propanediol triacrylate (C.A.S. 15625-89-5)) and HDODA (1,6-hexanediol diacrylate (C.A.S. 13048--33-4)) in all proportions. Such mixtures of $C_8DGE$ diacrylate in these non-fluorinated reactive diluents ranged from 500 ppm to 500,000 ppm. All mixtures were cured by Electron Beam at doses of 2–4 Megarads to give clear, glossy coatings on various substrates such as aluminum, polyester, or polyethylene-coated paper stock. These coatings contained no "fisheye" appearance, indicative of no gross phase separation.

These same mixtures of $C_8DGE$-diacrylate in TMPTA or HDODA were cured by UV irradiation with 3 wt % 2,2 diethoxyacetophenone as a photoinitiator. A single 200 watt medium pressure Hg lamp with nitrogen inerting allowed UV curing at line speeds of 50–300 ft/min. Failure to use a nitrogen atmosphere for UV or EB curing led to either a tacky or cloudy surface, both of which are indications of oxygen inhibition of the acrylate polymerization.

Surface energy measurements were made on coated aluminum using contact angle measurements. Mixtures of $C_8DGE$-diacrylate in TMPTA exhibit a surfactant-like effect in that at very low levels of incorporation of $C_8DGE$-diacrylate, the surface energy was dramatically, and non-linearly lowered as shown in Table I below. The refractive index of UV-cured $C_8DGE$-diacrylate is 1.42.

TABLE I

| wt. % $C_8DGE$ - Diacrylate in TMPTA | Surface Energy Erg/Cm |
| --- | --- |
| 0 | 37 |
| 0.05 | 29.4 |
| 0.10 | 22.4 |
| 1.0 | 19.4 |
| 5.0 | 19.2 |
| 10.0 | 19.0 |
| 30.0 | 21.0 |
| 50.0 | 20.5 |
| 100.0 | 14.5 |

EXAMPLE 3

COMPARATIVE

In the Ishibashi et al. paper the fluorinated compound (C above) was used neat, that is, without dilution-and not blended with other acrylates. It was the inventors expectation that adding a long-chain fluorinated group would decrease its solubility. In fact, it was found that such a compound was miscible with other acrylates, thereby making possible blended coating precursors. Similar compounds are not miscible, as will be seen below.

Four related compounds were mixed with trimethylolpropane triacrylate (TMPTA) and 1H, 1H-pentadecafluorooctyl acrylate which are typical acrylates used in coating applications. The four compounds tested were:

| Compound | Formula |
|---|---|
| A | $CH_2=CHCOC(CF_3)_2$—[benzene ring]—$C(CF_3)_2OCCH=CH_2$ (with O=C and H/O groups as shown) |
| $A^1$ | Same as A but with $C_8F_{17}$ group on the central benzene ring |
| C | $CH_2=CHCOOCH_2CHCH_2OC(CF_3)_2$—[benzene ring]—$C(CF_3)_2OCH_2CHCH_2OOCCH=CH_2$ (with OH groups) |
| Invention | Same as C but with $C_8F_{17}$ group on the central benzene ring |

It will be seen that compounds A and $A^1$ correspond to those in U.S. Pat. No. 4,452,998, both with and without a $C_8F_{17}$ group attached to the central benzene ring. Compound C corresponds to one shown by Ishibashi et al. The compound of the present inventor differs from Compound C by having a $C_8F_{17}$ group.

Compounds A and $A^1$ were mixed with TMPTA (a tri-acrylate) and 1H, 1H-pentadecafluorooctyl acrylate (a mono-acrylate) in a 25/75 volume ratio at room temperature. The effect of the $C_8F_1$ was found to be significant.

| | Miscibility TMPTA | 1H, H-pentadeca fluorooctyl acrylate |
|---|---|---|
| A (w/o $C_8F_{17}$) | Partially | No |
| $A^1$(with $C_8F_{17}$) | No | Yes |

It can be seen that adding the $C_8F_{17}$ group to compound A made the compound less soluble in the non-fluorinated TMPTA but more soluble in the fluorinated acrylate. The addition of a $C_8F_{17}$ group to Compound C might be expected to decrease miscibility in TMPTA but that was not found to be the case, as will be seen in the following results.

| | Miscibility TMPTA | 1H, 1H-pentadeca fluorooctyl acrylate |
|---|---|---|
| C | Yes | Yes |
| Invention | Yes | Yes |

These results show that the compound of the invention is mutually soluble in both non-fluorinated and fluorinated acrylates. Therefore, it may be used in blends which substantially reduce costs of coatings and at the same time improving the refractive index, as will be seen below.

EXAMPLE 4

Blends of TMPTA and 1H, 1H-pentadeca fluorooctyl acrylate with compounds $A^1$, C, and Invention from Example 3 were measured for refractive index of the cured film, with the results shown in the following tables.

| wt. % in 1H, 1H-pentadeca fluorooctyl acrylate | $N_D^{20}$ | | |
|---|---|---|---|
| | $A^1$ | C | Invention |
| 0 | 1.3285 | 1.3285 | 1.3285 |
| 25 | 1.338 | 1.357 | 1.345 |
| 100 | 1.371 | 1.44 | 1.40 |

| wt. % in TMPTA | C | Invention |
|---|---|---|
| 0 | 1.473 | 1.473 |
| 10 | 1.471 | N/A |
| 20 | 1.470 | N/A |
| 25 | N/A | 1.464 |
| 30 | 1.466 | N/A |
| 50 | 1.459 | 1.445 |
| 100 | 1.441 | 1.40 |

It will be seen that the fluorinated diacrylate of the invention provides lower i.e. improved refractive index values in films as compared to those which employ compound C. Compound $A^1$ would provide still lower refractive index values, but its solubility in other acrylates is poor, as has been shown in Example 2.

I claim:
1. A miscible mixture which is curable to form a polymer coating comprising:
    (a) a fluorinated diacrylate monomer having the formula:

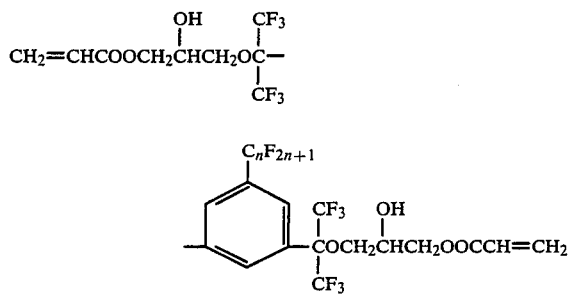

where n is an integer from 1 to 30;

(b) a fluorinated monoacrylate; and
(c) a triacrylate.

2. A composition of claim 1 comprising 1–30 volume % of the fluorinated diacrylate monomer, 1–30 volume % of a triacrylate, and 50–90 volume % of a monoacrylate.

3. A composition of claim 2 werein said triacrylate is trimethylolpropanetriacrylate.

4. A composition of claim 2 wherein said monoacrylate is 1H, 1H-pentadeca fluorooctyl acrylate.

5. A composition of claim 1 wherein said refractive index is 1.4 or lower.

6. A composition of claim 1 where N is 6, 8, or 10.

7. a composition of claim 6 where N is 8.

* * * * *

UNITED STATES PATENT AND TRADEMARK OFFICE
CERTIFICATE OF CORRECTION

PATENT NO. : 4,914,171
DATED : April 3, 1990
INVENTOR(S) : Andrew M. Zweig

It is certified that error appears in the above-identified patent and that said Letters Patent is hereby corrected as shown below:

ON THE TITLE PAGE
Abstract, line 2:     "Diglycidyl either" should read --diglycidyl ether--

Column 4, line 48:     "gylcidyl" should read --glycidyl--

Column 7, line 1 (Compound A): that part of the formula

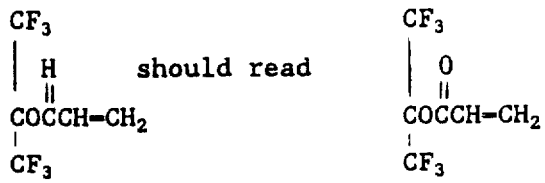

Column 7, line 14 (Compound A$^1$): that part of the formula

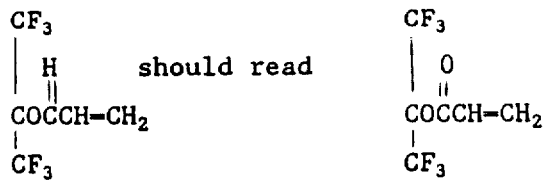

Column 7, line 41:     "$C_8F_1$was found" should read --$C_8F_{17}$ was found--

Signed and Sealed this

Twenty-first Day of January, 1992

Attest:

HARRY F. MANBECK, JR.

*Attesting Officer*      *Commissioner of Patents and Trademarks*